Dec. 15, 1936.  W. J. DE WITT  2,064,419
FISH LURE
Filed Aug. 17, 1935
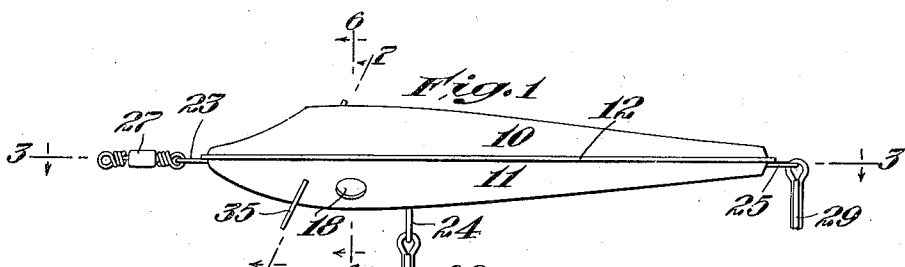
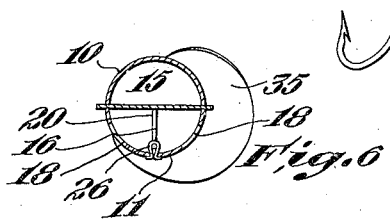
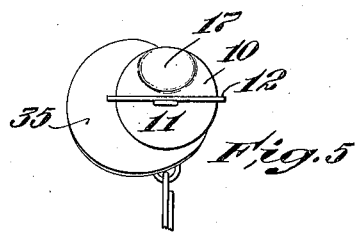
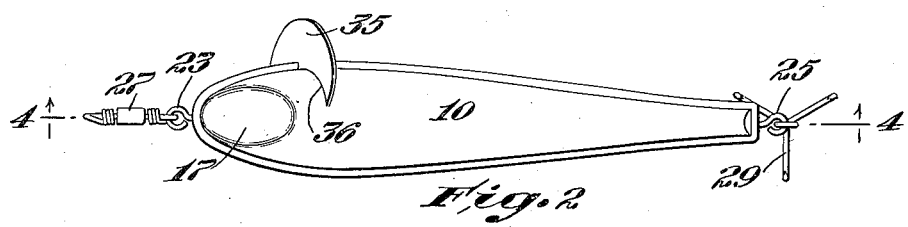
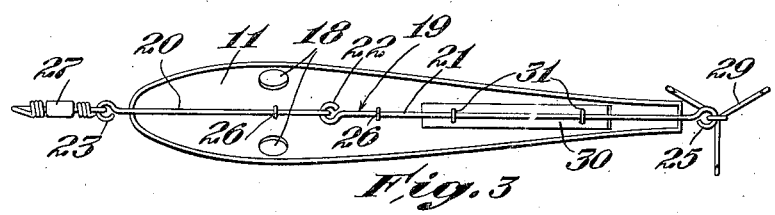
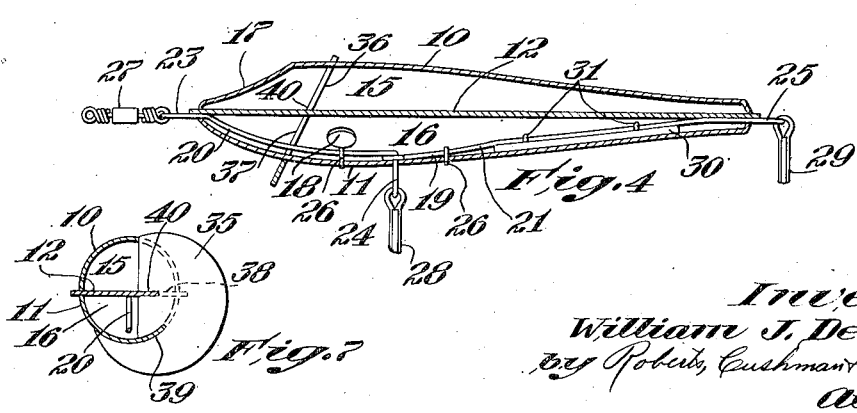
Inventor
William J. DeWitt
by Roberts, Cushman & Woodberry.
Att'ys.

Patented Dec. 15, 1936

2,064,419

UNITED STATES PATENT OFFICE 2,064,419

FISH LURE

William J. De Witt, Auburn, N. Y., assignor to Shoe Form Co., Inc., Auburn, N. Y., a corporation of New York Application August 17, 1935, Serial No. 36,676

4 Claims. (Cl. 43—46)

This invention relates to an improvement in a fish lure and more particularly in a lure embodying further developments of the structure disclosed in my copending applications Serial No. 750,660, filed October 30, 1934 and Serial No. 22,805, filed May 22, 1935.

The primary object of this invention is to provide a fish lure having a hollow body, made up of upper and lower concave sections and a partition between said sections and forming therewith two separate compartments, the upper compartment being water tight to insure buoyancy and the lower compartment containing a weight by which the lure is normally held upright, such weight being, if desired, so located that it insures proper action of the lure when casting.

A further object of this invention is to provide a fish lure having a hollow body and simulating a minnow or other small fish, and including a concave or flattened area of the upper surface at the head of the lure which will, when relative motion between the lure and water is set up, impart to the lure a tendency to dive below the surface of the water, and an offset plate which, when such relative motion is set up, causes a rotation and irregular wabbling of the lure.

These and other objects will appear from a consideration of the following description and of the drawing which forms a part thereof and in which Fig. 1 is a side elevation of a fish lure embodying this invention;

Fig. 2 is a plan view thereof;

Figs. 3 and 4 are longitudinal sections taken along the lines 3—3 on Fig. 1, and 4—4 on Fig. 2 respectively;

Fig. 5 is a front end view of the lure; and

Figs. 6 and 7 are cross sections of the body of the lure taken substantially at the planes indicated by the lines 6—6 and 7—7 on Fig. 1.

The fish lure shown in the drawing has the semblance or appearance of a minnow and has a hollow body made from celluloid or other light formable material. The body is made up of two concave sections, an upper section 10 and a lower section 11, and a partition 12. The partition coacts with the sections to form upper and lower compartments designated respectively by the numerals 15 and 16. The edge of the partition preferably projects beyond the surface defined by the sections and provides a definite ridge as shown particularly in Figs. 5 and 6.

The upper compartment 15 is sealed watertight to form an air chamber which imparts buoyancy to the lure in the water. The surface of the section 10 at the head of the lure is provided with a flattened area 17 which, as shown particularly in Figs. 1, 4, and 5, extends downwardly and forwardly and gives the lure a tendency to dive when relative motion is set up between the lure and the water.

The lower compartment 16 is provided with one or more openings 18 in the wall of the section 11 through which water may flow into the compartment. Mounted in this compartment is a frame 19 consisting, in this embodiment, of wires 20 and 21, the former wire having an angular portion which passes through a loop 22 in the latter wire. The ends of the wire 20 project beyond the head and belly of the lure in loops 23 and 24 and one end of the wire 21 projects beyond the tail of the lure in a loop 25. The frame is secured to the section 11 by staples 26 and to it are connected the lead line, not shown, through a coupler 27 at the loop 23 and the hooks 28 and 29 at the loops 24 and 25 respectively. The apertures in the section 11 through which the ends of the wires pass may be sealed or, since the compartment 16 is open to the water through the openings 18, may be left unsealed if desired.

Suitably mounted in the lower compartment 16 is a weight 30 by which the lure is held upright when floating in the water. The weight 30 is here shown secured to the wire 21 of the frame 19 between the staple 26 and the loop 25 by means of staples 31. When casting, the lure, because the weight is near the tail end, swings out freely and lands upright on the water. The weight being located near the tail has a tendency when the line is at rest to depress that end of the lure almost to sink it in spite of the buoyancy imparted by the air chamber in the upper compartment.

Mounted upon the lure near the head is a plate 35 inclined downwardly forward (Fig. 1) and projecting from one side of the lure (Fig. 5). This plate has the general appearance of an offset fin. As the lure and water move relatively, the contact of the water with the plate causes the lure to wabble so it has the appearance of a wounded minnow. The plate 35 may be secured to the body of the lure in any desired manner and may be of any suitable conformation. As here shown (see Fig. 7) the plate 35 is circular with one segment cut away. Slots 36 and 37 are cut in the walls of the sections 10 and 11 and a slot 38 is cut in the partition 12 through which slots a portion of the plate enters the interior of the lure. A curved slot 39 in the plate 35 receives a portion of the wall of the section 11 and a slot 40 receives a portion of the partition 12. The plate is secured in this position by means of acetone or other adhesive and the slots are sealed as pointed out above. The upper compartment 15 is water-tight. When relative motion of the line and water is set up the inclination of the plate 35 has a tendency to depress the lure which tendency is counteracted by the projecting edge of the partition 12.

The sections 10 and 11 and the partition 12 are assembled to form the lure after the frame 19 and weight 30 have been secured in position as pointed out above. The abutting surfaces of the sections and partition are joined by the use of any suitable adhesive. The plate 35 is then mounted upon the head of the lure.

While one embodiment only has been shown and described it will be understood that I am not limited thereto and that other embodiments may be made without departing from the spirit and scope of the invention as set forth in the following claims.

I claim:

1. A fish lure comprising a hollow body simulating a minnow or other small fish and consisting of an upper concave section, a lower concave section and a partition forming with said sections upper and lower compartments, a frame within said lower compartment and secured to the section wall thereof and a weight carried by said frame, the upper compartment being water-tight whereby the lure is buoyant and held upright by the weight.

2. A fish lure comprising a hollow body simulating a minnow or other small fish and consisting of an upper concave section, a lower concave section and a partition forming with said sections upper and lower compartments and a weight mounted in the lower compartment near the rear end thereof.

3. A fish lure comprising a hollow body simulating a minnow or other small fish and consisting of an upper concave section, a lower concave section and a partition forming with said sections upper and lower compartments and an off set plate at the head of the lure which gives the lure a tendency to wabble when relative motion is set up between the lure and the water in which it rests.

4. A fish lure comprising a hollow body or other small fish consisting of an upper concave section, a lower concave section and a partition forming with said sections upper and lower compartments, the edge of the partition projecting beyond the walls of the sections to form a ridge, and a downwardly and forwardly inclined plate at the head of the lure, said plate, when relative motion is set up between the lure and the water on which it rests, having a tendency to depress the lure which tendency is counteracted by the ridge formed by the projecting edge of the partition.

WILLIAM J. DE WITT.